United States Patent
Evenden

(10) Patent No.: US 11,665,630 B2
(45) Date of Patent: May 30, 2023

(54) IDENTIFICATION OF WIRELESS TRANSMISSIONS CARRIED BY A WIRELESS NETWORK

(71) Applicant: BRITISH TELECOMMUNICATIONS PUBLIC LIMITED COMPANY, London (GB)

(72) Inventor: Richard Evenden, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/250,719

(22) PCT Filed: Jun. 13, 2019

(86) PCT No.: PCT/EP2019/065536
§ 371 (c)(1),
(2) Date: Feb. 24, 2021

(87) PCT Pub. No.: WO2020/038624
PCT Pub. Date: Feb. 27, 2020

(65) Prior Publication Data
US 2021/0219216 A1  Jul. 15, 2021

(30) Foreign Application Priority Data
Aug. 24, 2018 (EP) .................................... 18190849

(51) Int. Cl.
H04W 4/00 (2018.01)
H04W 48/16 (2009.01)
H04W 84/12 (2009.01)

(52) U.S. Cl.
CPC ............ *H04W 48/16* (2013.01); *H04W 84/12* (2013.01)

(58) Field of Classification Search
CPC ..... H04W 48/16; H04W 84/12; H04W 84/18; H04W 80/04; H04W 88/06; H04W 8/26
USPC ....................................................... 370/338
See application file for complete search history.

(56) References Cited

U.S. PATENT DOCUMENTS

| | | | |
|---|---|---|---|
| 7,370,362 | B2 | 5/2008 | Olson et al. |
| 8,000,698 | B2 | 8/2011 | Wolman et al. |
| 8,438,270 | B2 | 5/2013 | Nappier et al. |
| 8,789,191 | B2 | 7/2014 | Bhagwat et al. |
| 9,198,118 | B2 | 11/2015 | Larue et al. |

(Continued)

OTHER PUBLICATIONS

Aruba, "Wired and Wireless Rogue Detection," published Jul. 4, 2014, 2 pages.

(Continued)

Primary Examiner — Temica M Beamer
(74) Attorney, Agent, or Firm — Patterson Thuente, P.A.

(57) ABSTRACT

A wireless sniffer for analyzing the channel quality of a Wireless Local Area Network (WLAN) identifies which of the wireless transmissions it detects over a wireless interface are carried on the WLAN it is analyzing by having a dedicated link from a network management system controlling the WLAN under investigation, over which signature data such as a MAC ID associated with the WLAN is received and stored for comparison with signature data associated with the wireless transmissions it detects on the wireless interface it can identify which of the received wireless transmissions are carried on the WLAN it is to analyze.

8 Claims, 3 Drawing Sheets

(56) References Cited

U.S. PATENT DOCUMENTS

| | | | |
|---|---|---|---|
| 9,544,798 | B1 | 1/2017 | Ahmadzadeh et al. |
| 9,648,548 | B1 | 5/2017 | Gan et al. |
| 2006/0002331 | A1 | 1/2006 | Bhagwat et al. |
| 2006/0193300 | A1 | 8/2006 | Rawat et al. |
| 2007/0171885 | A1 | 7/2007 | Bhagwat et al. |
| 2009/0235354 | A1 | 9/2009 | Gray et al. |
| 2011/0167263 | A1* | 7/2011 | Cross ............... H04W 12/0431 713/168 |
| 2012/0240196 | A1 | 9/2012 | Bhagwat et al. |
| 2015/0139211 | A1 | 5/2015 | Ji |
| 2017/0353374 | A1 | 12/2017 | Shatil et al. |

OTHER PUBLICATIONS

Cisco, "Rogue Management in a Unified Wireless Network using v7.4," Aug. 10, 2010, 42 pages.

Extended European Search Report for Application No. 18190849.2, dated Oct. 30, 2018, 14 pages.

International Preliminary Report on Patentability for Application No. PCT/EP2019/065536, dated Nov. 27, 2020, 22 pages.

International Search Report and Written Opinion for Application No. PCT/EP2019/065536, dated Sep. 10, 2019, 17 pages.

Invitation to Correct Defects in the Demand for Application No. PCT/EP2019/065536, dated May 25, 2020, 11 pages.

Office Action for GB Application No. 1813881.8, dated Feb. 26, 2019, 6 pages.

Office Action for GB Application No. 1813881.8, dated Jul. 31, 2020, 2 pages.

Stellarix, "Novelty Search Report Determining the Channels and BSSIDs that form a targeted 802.11 wireless network," Feb. 15, 2018, 32 pages.

Written Opinion of the International Preliminary Examining Authority for Application No. PCT/EP2019/065536, dated Sep. 22, 2020, 16 pages.

Communication pursuant to Article 94(3) EPC for European Application No. 19729316.0, dated Jul. 15, 2022, 12 pages.

* cited by examiner

IDENTIFICATION OF WIRELESS TRANSMISSIONS CARRIED BY A WIRELESS NETWORK

PRIORITY CLAIM

The present application is a National Phase entry of PCT Application No. PCT/EP2019/065536, filed Jun. 13, 2019, which claims priority from EP Patent Application No. 18190849.2, filed Aug. 24, 2018, each of which is hereby fully incorporated herein by reference.

TECHNICAL FIELD

This disclosure relates to identification of wireless networks, and more specifically identification of channels and base station identities that form a targeted wireless local area network (WLAN), such as those designed according to the IEEE 802.11 standard also known as "WiFi"

BACKGROUND

IEEE 802.11 is a set of standards that define the specification for a Wireless Local Area Network. Wireless Sniffing is a technology that is used to capture Wireless packets as they are sent over the air in a WLAN and store them in order to run tools on them in order to diagnose and analyze network problems and behaviors. Commercial Wireless Sniffers are available such as AirPcap, Omnipeek, AirMagnet and CommView as well a Custom Built Wireless Sniffers using commercially available Hardware such as Laptops and Wi-Fi Routers.

As WLAN radio channels are unlicensed, the same radio channel may be in use by any number of neighboring WLANs. In operation, a Sniffer will capture all wireless packets on the radio channels to which it is tuned, which may include packets carried on wireless networks other than that in which it is operating. When using a Wireless Sniffer in such an environment it is desirable that only the packets of a particular WLAN are captured, rather than capturing all the packets from all the visible WLANs.

In another situation capturing the wireless packets has privacy implications concerning how the captured data is stored and used. In such cases it would be necessary to anonymize wireless packets (before storage) for any packets that are captured from neighboring WLANs.

It is therefore desirable to have the ability to identify wireless packets that belong to a particular WLAN, with little or no prior manual configuration.

It is known, for example from U.S. Pat. No. 8,789,191, to connect a wireless sniffer to a WLAN base station both wirelessly and using a wired connection, in order to detect unauthorized network access.

SUMMARY

According to the disclosure there is provided a method of identifying wireless transmissions carried on a first wireless network, comprising from a network management system controlling the first network, performing a probe operation on a fixed connection to the first network to identify active addresses on the first network; identifying signature data associated with the active addresses on the first network; transmitting the signature data over a dedicated link to a wireless sniffer device; using the sniffer device to detect wireless transmissions using a wireless receiver; identifying transmission signature data associated with each wireless transmission detected by the sniffer device; and comparing the signature data received over the dedicated link with signature data associated with the wireless transmissions to identify wireless transmissions carried on the first wireless network.

Another aspect of the disclosure provides apparatus for identifying wireless transmissions carried on a first wireless network, comprising a network management system controlling the first network, and a sniffer device, the network management system comprising: a probing unit for performing probes on fixed connections to the first network to identify active addresses on the first network, means for identifying signature data associated with the active addresses on the first network, and means for transmitting the signature data over a dedicated link to a wireless sniffer device; and the wireless network sniffer device comprising: an interface unit for connection to a dedicated link from a network management system controlling the first wireless network, for receiving signature data associated with the first network; a wireless receiver for detecting wireless transmissions and identifying transmission signature data associated with the wireless transmissions; a selector for comparing signature data received by the interface unit with signature data detected by the wireless receiver.

A similarity metric may be used to compare base station identities (BSSIDs) detected by the wireless receiver with MAC addresses reported on the dedicated link. A similarity metric may also be used to compare a plurality of Service Set Identities (SSIDs) detected by the wireless receiver with each other in order to classify closely matching SSIDs as belonging to a particular WLAN.

A static list may be used to exclude of known Public SSIDs from consideration

The method may be used to identify transmissions received by the receiver not having signature data associated with the first network, allowing such transmissions to have the data contained therein to be anonymized before analysis.

The dedicated link may be a fixed Ethernet or Powerline connection, or a wireless connection operating in a frequency band separate from that of the first wireless network. Alternatively, the network management system may be incorporated in a wireless communications server also incorporating a sniffer element for receiving the wireless transmissions.

Embodiments of the present disclosure use similarity metrics between the wireless and wired networks so that wireless packets can be classified as either belonging to the connected WLAN or to a neighboring WLAN. This mechanism can be used by a wireless sniffer to automatically distinguish between the wireless traffic on a targeted network and the wireless traffic on a neighboring network.

A wireless Sniffer is a device that listens on one or more radio channels (e.g. for a dual band Sniffer, a 5 GHz channel and a 2.4 GHz channel) for wireless packets and captures them on a storage device. The wireless packets captured can then be viewed or processed using standard tools (e.g. Wireshark) to analyze the behavior of the wireless network. As WLAN radio channels are unlicensed, the same radio channel can be used by any number of neighboring networks. When operating, a Sniffer will capture all wireless packets on the radio channels to which it is tuned, which may include packets on multiple wireless networks.

The present disclosure provides a mechanism that can be used by a wireless sniffer to automatically distinguish between the wireless traffic on a targeted network and the wireless traffic on a neighboring network. The differentiation between the targeted and the neighboring network is important as the Sniffer can then treat packets differently, e.g. by anonymizing neighboring packets (to adhere to privacy regulations) or by dropping neighboring wireless packets and only capturing targeted wireless network packets, etc.

BRIEF DESCRIPTION OF THE FIGURES

By way of example, an embodiment of the disclosure will be described with reference to the drawings, in which.

DETAILED DESCRIPTION OF EMBODIMENTS

Figure 1:
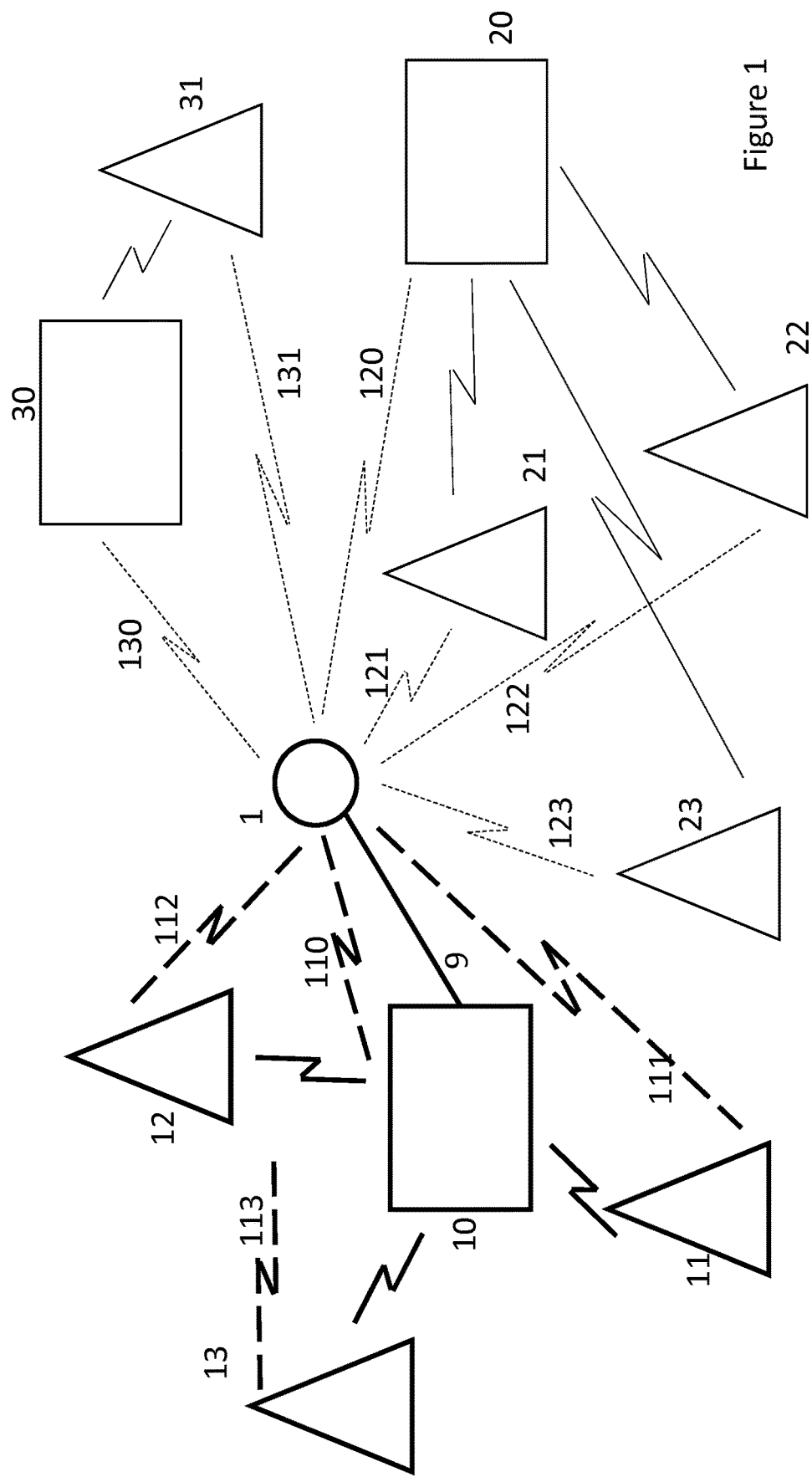
FIG. 1 is schematic depiction of a number of wireless networks, one of which includes a network management system and a sniffer operating according to an embodiment of the disclosure.

In this embodiment a wireless network can be targeted by physically connecting the sniffer to the network's logical network segment with a fixed layer-2 connection (e.g. Ethernet, Powerline etc.). As shown in FIG. 1, three wireless network routers 10, 20, 30 serve respective groups of access points 11, 12, 13; 21, 22, 23; 31. A sniffer 1 is arranged to detect transmissions 110, 111, 112, 113 associated with the WLAN operated by the router 10 but, for the purposes of illustration, it is assumed that transmissions 113 from one of the access points 13 are failing to be detected. However, the sniffer can also detect transmissions 120, 121, 122, 123, 130, 131 from the other networks and needs to distinguish these from those associated with the network it is concerned with.

The sniffer 1 may be embodied as a component of the router 10 of its own network, but for clarity it is depicted here as a separate element, with a connection 9 to the router 10, this connection being independent of the wireless LAN. The connection may be a fixed line such as ethernet or powerline system, or it may be a wireless connection operating in a frequency band separate from that in which the "sniffing" is taking place, or otherwise distinguishable from such transmissions. This link 9 allows communication between the sniffer 1 and router 10.

Figure 2:
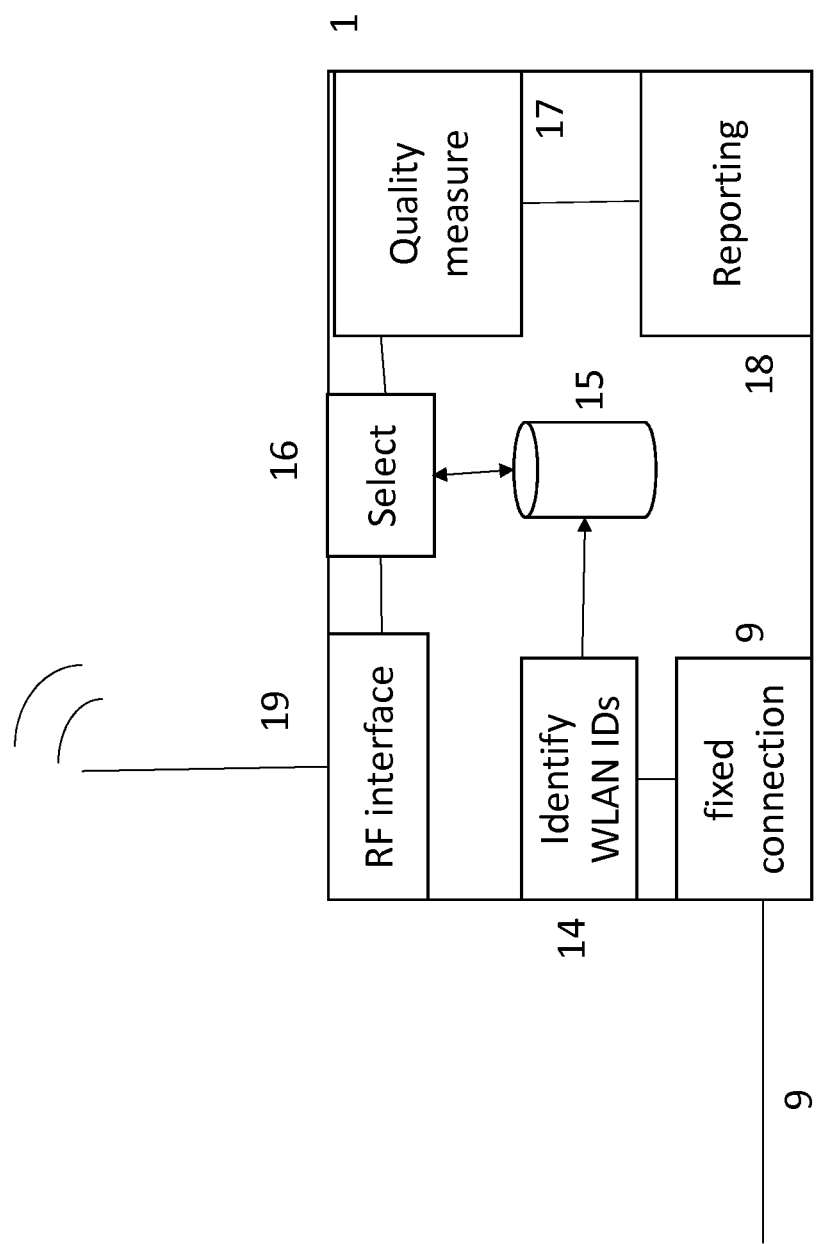
FIG. 2 is a schematic representation of the functional elements of a wireless sniffer.

The functional elements of the sniffer 1 are depicted in FIG. 2. These may be embodied in software. The sniffer has an RF interface 19 capable of receiving radio beacons in the frequency band or bands of relevance to the WLAN it is serving. It also has an interface such as an Ethernet connection 9 through which it can communicate with the router 10 independently of the radio interface 13. It will be understood that the fixed connection 9 can communicate only with the associated router 10, whilst the RF interface is able to detect radio beacons from any RF sources 10-12, 20-23, 30, 31 within range, regardless of which WLAN they are part of. It is also possible that an RF source 13 operating on the associated WLAN fails to be detected by the sniffer, if for example the source is in a location at which the signal is suffering severe attenuation, or there is a fault with its RF transmitter.

The sniffer 1 has a data interface 14 which communicates with the router 10 over the connection 9 to probe the access points 10, 11 12, 13 on the associated WLAN to retrieve their network identities (BSSIDs) and store them in a data store 15.

A selection processor 16 has provision for comparing network identities of signals received by the RF interface 19 with network identities of signals detected by the dedicated interface. Signals which match the stored data are forwarded to a quality measurement function 17 which analyzes the signals for properties such as Bit/error rate, signal to noise ratio, etc., and forwards the results to an output 18. The output 18 may be a human interface such as a screen, a data store such as flash drive, or an interface with a communications medium to transmit the measurements to a remote location.

Connecting the Sniffer to the subnet 10 with a fixed or other duplicate connection 9 gives the Sniffer two views onto the network. By correlating information from these two views it is possible for the Sniffer to determine which of the wireless BSSIDs 10, 11, 12 (i.e. Wireless Access Points) it can detect are on the targeted wireless network, and which BSSIDs 20, 21, 22, 23; 30, 31 it can detect are on neighboring networks. Once the sniffer has determined this it can differentiate the captured wireless packets as either targeted or neighboring packets appropriately. The sniffer may also report if any BSSID's that should be detected are in fact absent.

In this specification, the following terms are used with the following definitions:

A scan is an operation carried out when the Sniffer iterates through all the radio channels in a band and listens for any beacons on that channel. A beacon is sent out by an Access Point periodically, for example every 100 ms, and contains the BSSID and Capabilities of that Access Point. The strength of the signal of the beacon (i.e. RSSI) also gives an indication of the distance to the Access Point. After a scan operation on each band the Sniffer has knowledge of all the active wireless APs in the area.

Private BSSIDs are those whose SSID is not in the list of known Public SSIDs.

An arping is a command that takes an IP address and (if the IP address is active on the subnet) will return the MAC address associated with that IP address. In class C subnets (the most common) there can be up to 253 active hosts so, by issuing arping requests for all 253 class C IP subnet addresses, the MAC address of any active network interface on the subnet can be determined.

Close BSSID match: The octets of two BSSIDs (respectively detected on the F interface and stored in the data store 15 of the associated WLAN) are compared in order to determine how many bits they differ by. If they differ by less than a defined number of bits (or zero—an exact match) they are classified as a close match.

Close SSID match: If an SSID in the Distribution System BSSIDs list is a close SSID match of an SSID in the Scanned BSSID list it is probable that the second SSID is a wireless Extender in the Distribution System. Commonly Extenders have SSIDs that contain the same SSID as the Wireless AP (which is often prefixed or postfixed with some other string). Sometimes the extender uses the same SSID as the AP so an exact match is also defined as a close match.

The Sniffer gathers information from both the fixed and wireless views. In the wireless view scans are carried out on the 2.4 GHz and 5 GHz bands and for each BSSID detected the following information is gathered.

BSSID: Basic Service Set Identifier

SSID: Service Set Identifier. This value can be used to determine if the BSSID is hosting a public network on a known SSID (e.g. BT-FON, BTWiFi, BTOpenzone etc.). Any related BSSIDs with similar names (e.g. "EXT2-BTHub6-XGH", "EXT5-BTHub6-XGH" etc.) can also be identified.

RSSI: Received Signal Strength Indication (dBm). This value can be used to determine how close the BSSID is to the Sniffer relative to other BSSIDs.

Channel: For 2.4 GHz channels the channel has a value between: 1-13, for 5 GHz channels it can be 36-48, 52-64 and 100-144.

Bandwidth: For 2.4 GHz channels the bandwidth can be: 20 MHz or 40 MHz. For 5 GHz bandwidths can be: 20 MHz, 40 MHz or 80 MHz.

Type: Defines whether the scanned network is either Public (e.g. BTWiFi-with-FON) or Private.

In the fixed view, using the command: "ip ro" the following information can be extracted:

Default gateway IP Address: for example 192.168.1.1
Subnet address/class: Normally the subnet is configured as a class C subnet which has 254 possible IP addresses: for example 192.168.1.1-192.168.1.254

An "arping" is carried out on each host IP address in the subnet in order to discover all active MAC addresses on the subnet. The "arping" operation is a computer software tool for discovering and probing hosts on a computer network. Arping probes hosts on the attached network link by sending Link Layer frames using the Address Resolution Protocol (ARP) request method addressed to a host identified by its MAC address of the network interface.

This embodiment determines which of the BSSIDs seen on the wireless channels are on the targeted network and which on a neighboring network. Once it has determined the set of BSSIDs that form the targeted network it can then identify which channels to listen to in order to capture the wireless traffic on the targeted network, and can also identify which BSSIDs are to be anonymized.

Figure 3:
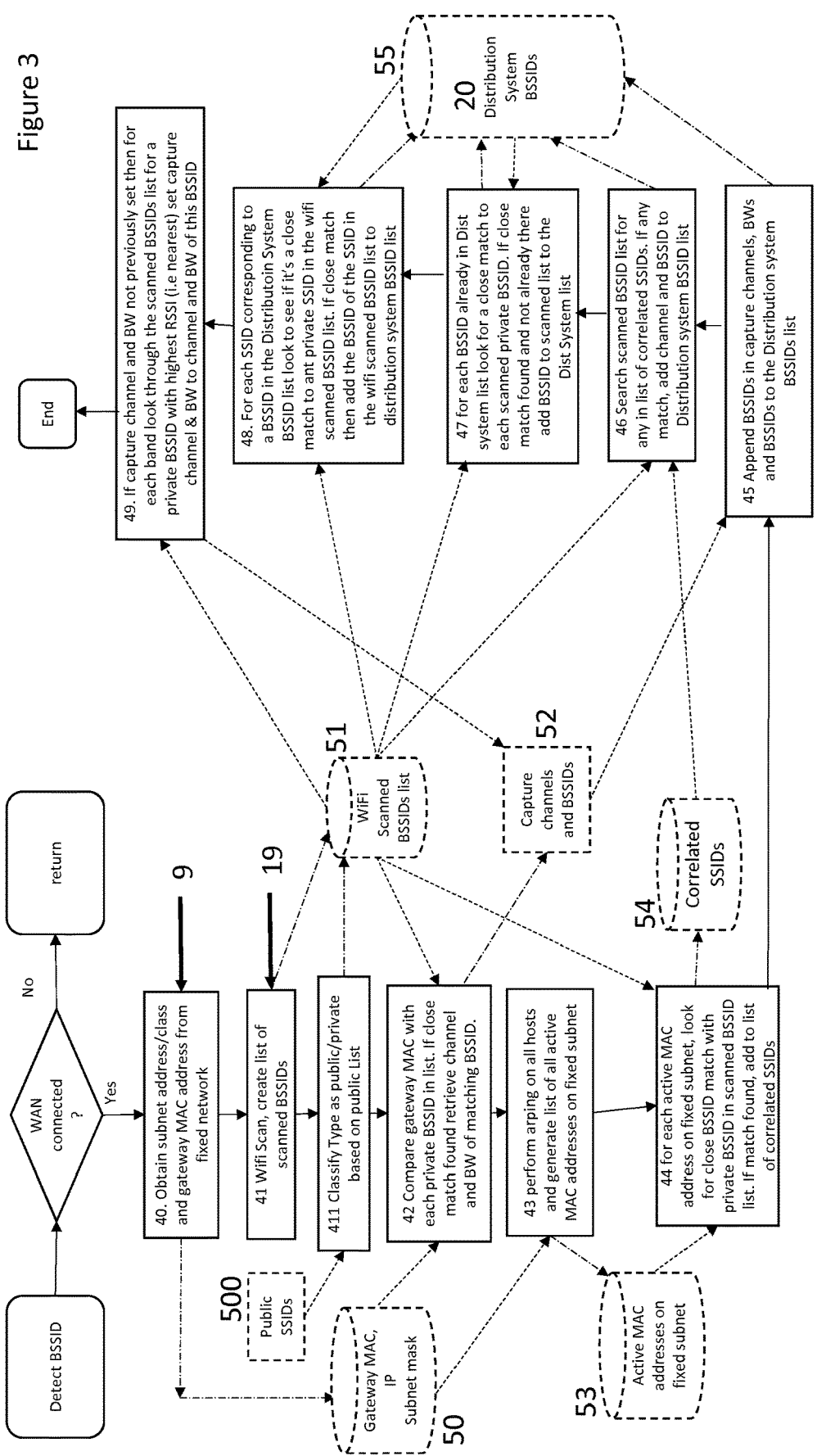
FIG. 3 is a flow chart depicting operation of the network management system and wireless sniffer.

The operation of the sniffer is depicted in the flow chart in FIG. 3.

At 40 the subnet address/class and Gateway MAC address are obtained from the fixed network connection 9 using the command "ip ro". The Gateway MAC, IP, and Subnet mask data are stored (in a store 50) by the sniffer for use in later stages.

At 41, a Wi-Fi scan is carried out using the RF interface 19 on both the 2.4 GHz and 5 GHz bands to create a list of scanned BSSIDs. Each BSSID in the list is then classified as Public or Private (step 411) based on a Public SSID list 500 obtained over the fixed link 9 or previously stored. The data SSID, RSSI, Band, Channel/BW, BSSID and Type are stored in a list 51 of scanned BSSIDs.

At 42 the Gateway MAC is compared with each Private BSSID in the Scanned BSSIDs list 51. If a close match is found, the Band, Channel & Bandwidth of the matching BSSID are retrieved from the store 50 and the result stored in a list of channels to be monitored 52. This operation allows the Sniffer to determine the Channel & BW of the wireless AP that it is connected to.

At 43, an arping operation is carried out (over the fixed network connection 9) on all hosts in the subnet, whose Gateway MAC, IP, Subnet mask are again retrieved from the store 50 and the response IP and MAC of all replying hosts is recorded in order to obtain a list of all active MAC addresses on the fixed subnet, which is sent to a store 53.

At 44, for each Active MAC address on the fixed subnet (retrieved from store 53), a close BSSID match is sought to a Private BSSID in the Scanned BSSIDs list 51. If a close match is found the SSID of the matching BSSID is added to a list 54 of Correlated SSIDs.

At 45, the BSSIDs in the Capture Channels 52, are appended to a Distribution System BSSIDs list 55.

At 46, the Scanned BSSIDs list 51 is scanned for any SSID that is also in the list 54 of Correlated SSIDs. For any matching SSID, the Band and BSSID are added to the Distribution System BSSIDs list 55 if they are not already present.

At 47, for each BSSID already in the Distribution System BSSIDs list 55, a close BSSID match is sought for each Scanned Private BSSID 51. If a close match is found, the BSSID in the Scanned BSSIDs list is added to the Distribution System BSSIDs list 55, if it is not already there.

At 48 a (temporary) list is constructed of SSIDs that correspond to the BSSIDs held in the Distribution BSSID list 55. Each SSID in this list is compared with the SSIDs in the WiFi Scanned BSSID List 51 to identify any that are a close SSID match. The BSSIDs that correspond to the closely matching SSIDs are added to the Distribution list 55.

At 49, if the process up until this point has not resulted in a valid channel and bandwidth for a given band (i.e. an empty list 52) the Scanned BSSIDs list 51 is checked for a Private BSSID with the highest RSSI (i.e. the nearest). The Channel and BW of the nearest BSSID are thus adopted as a default setting for the sniffer.

The invention claimed is:

1. A method comprising, by a wireless network sniffer device:
   receiving, at an interface unit of the sniffer device, over a dedicated link from a network management system controlling a wireless local area network (WLAN), first network identity signature data associated with the WLAN;
   detecting, at a wireless receiver of the sniffer device, wireless transmissions;
   identifying second network identity signature data from each of the wireless transmissions;
   comparing the first network identity signature data with the second network identity signature data to identify a first subset of the wireless transmissions that were carried on the WLAN and a second subset of the wireless transmissions that were not carried on the WLAN, by:
      comparing first octets of a first Service Set Identity (SSID) in the first network identity signature data with second octets of a second SSID in the second identity signature data;
      determining that the first octets and the second octets differ by less than a predetermined number of bits, wherein the predetermined number comprises at least two;
      classifying, in response, the second SSID as belonging to the WLAN; and
      assigning, in response, a wireless transmission corresponding to the second SSID to the first subset of the wireless transmissions;
   dropping the second subset of the wireless transmissions not identified as having been carried on the WLAN; and
   capturing only the first subset of the wireless transmissions identified as having been carried on the WLAN for analysis without capturing the second subset of the wireless transmissions.

2. The method of claim 1, wherein comparing the first network identity signature data with the second network identity signature data comprises applying a similarity metric, wherein the second network identity signature data identified from the wireless transmissions comprises base station identities (BSSIDs) detected by the wireless receiver, and wherein the first network identity signature data comprises MAC addresses reported on the dedicated link.

3. The method of claim 1, further comprising:
applying a similarity metric to compare a plurality of SSIDs of the second network identity signature data detected by the wireless receiver with each other; and
classifying closely matching SSIDs as belonging to a common WLAN.

4. The method of claim 1, wherein identifying the first subset of the wireless transmissions further comprises excluding a static list of Public SSIDs from the first subset.

5. The method of claim 1, wherein the dedicated link comprises a fixed Ethernet connection or a Powerline connection.

6. The method of claim 1, wherein the dedicated link comprises a wireless connection operating in a first frequency band separate from a second frequency band of the WLAN.

7. The method of claim 1, wherein the network management system is incorporated in a wireless communications server also incorporating the wireless network sniffer device.

8. A wireless network sniffer device configured to:
receive, at an interface unit of the sniffer device, over a dedicated link from a network management system controlling a wireless local area network (WLAN), first network identity signature data associated with the WLAN;
detect, at a wireless receiver of the sniffer device, wireless transmissions;
identify second network identity signature data from each of the wireless transmissions;
compare the first network identity signature data with the second network identity signature data to identify a first subset of the wireless transmissions that were carried on the WLAN and a second subset of the wireless transmissions that were not carried on the WLAN by:
  comparing first octets of a first Service Set Identity (SSID) in the first network identity signature data with second octets of a second SSID in the second identity signature data;
  determining that the first octets and the second octets differ by less than a predetermined number of bits, wherein the predetermined number comprises at least two;
  classifying, in response, the second SSID as belonging to the WLAN; and
  assigning, in response, a wireless transmission corresponding to the second SSID to the first subset of the wireless transmissions;
drop the second subset of the wireless transmissions not identified as having been carried on the WLAN; and
capture only the first subset of the wireless transmissions for analysis without capturing the second subset of the wireless transmissions.

* * * * *